(12) United States Patent
Vollmert et al.

(10) Patent No.: US 12,026,653 B2
(45) Date of Patent: Jul. 2, 2024

(54) DATABASE SYSTEM AND METHOD FOR CARBON FOOTPRINT OPTIMIZATION

(71) Applicant: SAP SE, Walldorf (DE)

(72) Inventors: Steffen Vollmert, Frankfurt (DE); Hartmut Koerner, Ladenburg (DE)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 17/014,565

(22) Filed: Sep. 8, 2020

(65) Prior Publication Data

US 2022/0076182 A1   Mar. 10, 2022

(51) Int. Cl.
| | |
|---|---|
| G06Q 10/06 | (2023.01) |
| G06F 16/9538 | (2019.01) |
| G06Q 10/0631 | (2023.01) |
| G06Q 10/0637 | (2023.01) |
| G06Q 10/0639 | (2023.01) |
| G06Q 10/30 | (2023.01) |
| G06Q 50/26 | (2024.01) |

(52) U.S. Cl.
CPC ... *G06Q 10/06375* (2013.01); *G06F 16/9538* (2019.01); *G06Q 10/06315* (2013.01); *G06Q 10/0639* (2013.01); *G06Q 10/30* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 10,637,952 B1 | 4/2020 | Koenig et al. | |
| 2010/0274612 A1* | 10/2010 | Walker | G05B 19/41865 700/297 |
| 2016/0292704 A1* | 10/2016 | Walz | G06Q 30/0204 |
| 2018/0268423 A1* | 9/2018 | Thube | G06F 3/0481 |
| 2018/0276679 A1* | 9/2018 | Fang | G06Q 10/08 |

(Continued)

OTHER PUBLICATIONS

"Optimize Business Intelligence Efforts With Embedded, Application-Driven Analytics", Forrester Opportunity Snapshot: A Custom Study Commissioned by SAP, (Mar. 2019), 10 pgs.

(Continued)

*Primary Examiner* — Eric W Stamber
*Assistant Examiner* — Ashley Y Young
(74) *Attorney, Agent, or Firm* — SCHWEGMAN LUNDBERG & WOESSNER, P.A.

(57) ABSTRACT

Various examples are directed to using a web-based analytics system to determine a carbon footprint metric for a product. The web-based analytics system may import indirect carbon footprint data from an environmental compliance system and quantity structure data describing the product from an accounting system table. The web-based analytics system may identify, using the quantity structure data, a first constituent component for the product and import first constituent component carbon footprint data for the first constituent component. The web-based analytics system may identify an activity for the product and import activity carbon footprint data describing a carbon footprint for the activity. The web-based analytics system may determine the carbon footprint metric for the product using the first constituent component carbon footprint data, the activity carbon footprint data, and the indirect carbon footprint data.

20 Claims, 11 Drawing Sheets

(56) References Cited

U.S. PATENT DOCUMENTS

2019/0303379 A1 10/2019 Waas et al.
2023/0089662 A1 3/2023 Wang et al.

OTHER PUBLICATIONS

"U.S. Appl. No. 17/482,914, Corrected Notice of Allowability mailed Mar. 1, 2024", 2 pgs.
"U.S. Appl. No. 17/482,914, Final Office Action mailed Aug. 22, 2023", 12 pgs.
"U.S. Appl. No. 17/482,914, Non Final Office Action mailed Dec. 27, 2022", 9 pgs.
"U.S. Appl. No. 17/482,914, Notice of Allowance mailed Dec. 19, 2023", 8 pgs.
"U.S. Appl. No. 17/482,914, Response filed Mar. 27, 2023 to Non Final Office Action mailed Dec. 27, 2022", 11 pgs.
"U.S. Appl. No. 17/482,914, Response filed Nov. 22, 2023 to Final Office Action mailed Aug. 22, 2023", 11 pgs.
"AWS Database Migration Service User Guide Using Apache Kafka as a target", Amazon Web Services, [Online]. Retrieved from the Internet: URL: https://web.archive.org/web/20210703132928if_/https://docs.aws.amazon.com/dms/latest/userguide/dms-ug.pdf>, (Jul. 30, 2021), 120 pgs.
"European Application Serial No. 221965072, Extended European Search Report mailed Jan. 20, 2023", 10 pgs.
"SAP HANA on AWS SAP HANA Guides", Amazon Web Services, [Online]. Retrieved from the Internet: <URL: https://docs.aws.amazon.com/sap/latest/sap-hana/welcome.html>, (Jun. 1, 2020), 400 pgs.

* cited by examiner

DATABASE SYSTEM AND METHOD FOR CARBON FOOTPRINT OPTIMIZATION

TECHNICAL FIELD

This document generally relates to methods and systems for use with computer networks. More particularly, this document relates to ways of configuring and operating computing devices to use a web-based analytics system to optimize carbon footprint generation.

BACKGROUND

Databases are used in many different computer processing environments to store data, often in a structured and easily-accessible way. Many databases are managed by database management systems that execute database operations received from users. In some examples, a database management system identifies a database record or records matching a user search request.

BRIEF DESCRIPTION OF DRAWINGS

The present disclosure is illustrated by way of example and not limitation in the following figures.

DETAILED DESCRIPTION

Figure 1:
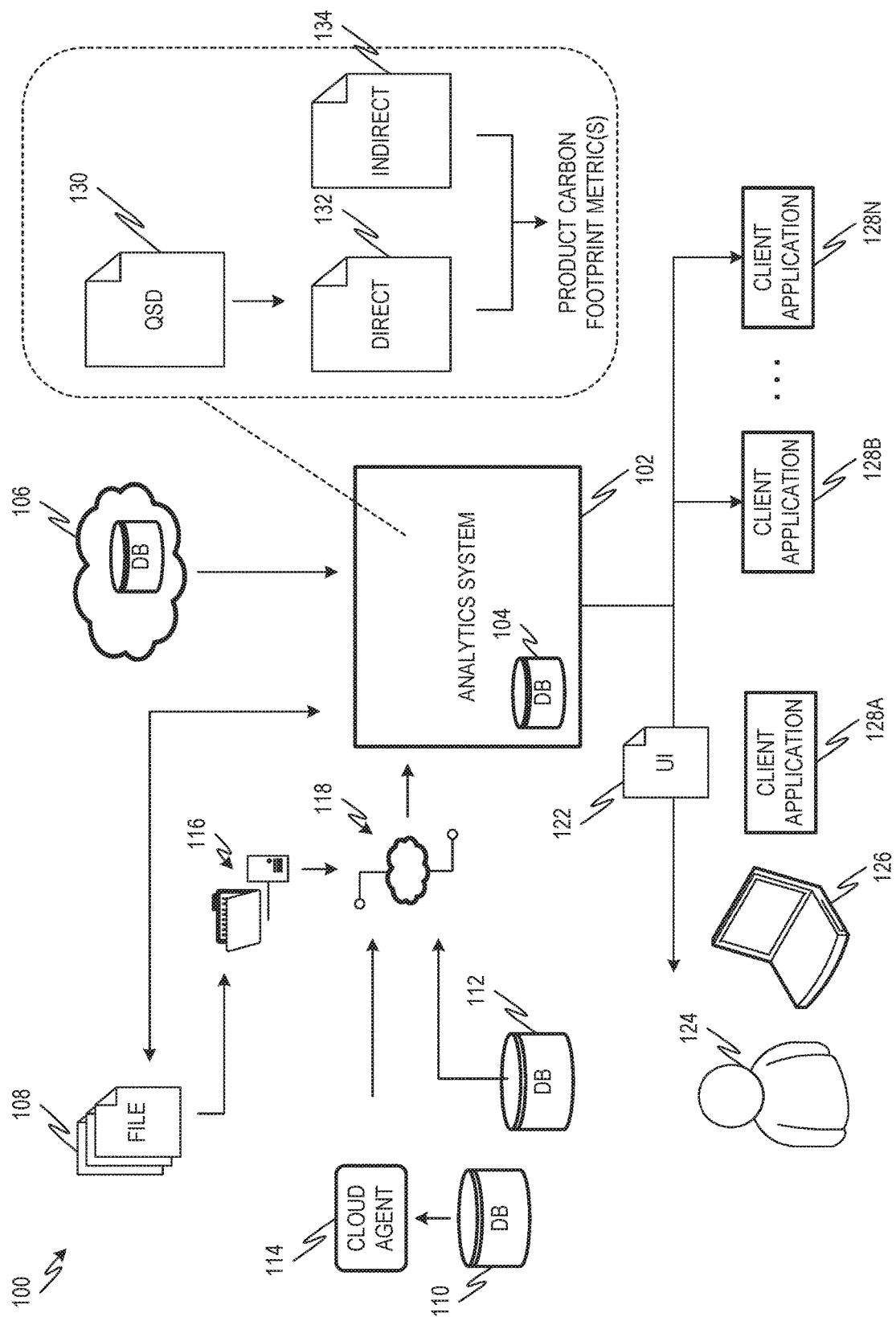
FIG. 1 is a diagram showing one example of an environment for generating carbon footprint metrics using distributed database systems.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject mailer. It will be evident, however, to those skilled in the art, that embodiments of the inventive subject matter may be practiced without these specific details. In general, well-known instruction instances, protocols, structures, and techniques have not been shown in detail.

It is desirable to leverage business data stored at database systems to quickly and accurately derive carbon footprint metrics. Carbon footprint metrics describe the amount of carbon dioxide or other greenhouse gases emitted or caused to be emitted by an individual, organization, or activity. For businesses that provide products, it may be desirable to determine detailed carbon footprint metrics associated with their products. For example, these detailed carbon footprint metrics can be used to consider the costs of emission certificates or other mechanisms created by government regulatory agencies for assigning costs to greenhouse gas emissions. For example, under such regulatory regimes, understanding the carbon footprint of a product may be necessary to determine the total financial impact of the product, including whether it is cost-effective to continue to produce the product.

Various examples described herein are directed to determining carbon footprint metrics for products and/or services utilizing direct and indirect carbon footprint data. Direct carbon footprint data describes factors that are associated with materials and/or activities that are consumed specifically to provide a good or service. Consider a business that generates body panels for a car. Direct carbon footprint data for the body panels describes the greenhouse gases generated to produce the component parts of the panels, such as sheet steel, plastic materials, paint, etc. Direct carbon footprint data also describes the greenhouse gasses generated by activities for assembling the component parts of the body panels, such as machining, painting, etc. Indirect carbon footprint data describes factors that are attributable to providing a product or service but are not directly attributable to the good or service. Returning to the body panel example above, heating, ventilation and air conditioning (HVAC) expenses at one or more plants where the body panels are manufactured.

Determining an accurate carbon footprint of a product or service, for example, using direct and indirect data, may use data from multiple distributed data sources, including data that is not typically stored at a single database system. For example, the quantity structure of a product describing the constituent components and activities that are consumed to produce the product may be retrieved from or derived from data retrieved from an accounting database. Carbon dioxide emissions data, greenhouse gas conversion data, and other data, however, may be stored at or derivable from an environmental compliance database system separate from the financial account database system.

Further, database systems are often technically optimized to store and process a particular type of data. For example, accounting database systems are often optimized to store financial accounting data. Examples of database system that can be optimized to store financial accounting data include the HANA and S/4 HANA systems available from SAP SE of Walldorf, Germany.

For example, the HANA and S/4 HANA systems include a universal journal table, sometimes referred to as the ACDOCA table. A universal journal table can include columns or fields for multiple different kinds of accounting journal entries, often leading to a table with a large number of columns. For example, the ACDOCA table provided by the HANA and S/4 HANA database systems can include several hundred columns. The large number of columns in the universal journal table may allow multiple different types of accounting journal entries to be included as table records in the same table.

A universal journal table may also include one or more extension ledgers, also referred to as appendix ledgers. An extension ledger is created as a layer on top of the universal journal table. The extension ledger references a subset of the journal entries of the universal journal table. Use of a universal journal table with extension ledgers can provide a technical advantage by more efficiently using memory. For example, a single universal journal table with one or more extension ledgers can be used to maintain multiple ledgers without storing duplicate journal entries at different tables.

Database systems utilizing a universal journal table may also be optimized to quickly and efficiently execute queries at large tables, such as a universal journal table. For example, the HANA and S/4 HANA systems are in-memory database management systems in which the column stores for tables, such as a universal journal table, are stored in memory, such as a random access memory (RAM) in addition to or instead of being stored at a disk storage mechanism. The optimizations of an in-memory database management system may allow for the quick and efficient execution of queries against large tables, such as a universal journal table.

When data for determining carbon footprint metrics is stored at technically-specialized databases, such as financial account databases with a universal journal table, it may not be practical to expand single systems to accommodate additional data for determining carbon footprint metrics, such as carbon footprint data, greenhouse gas conversion factors, plant-specific information, etc. For example, an accounting database system with a universal journal table is already optimized to provide disparate types of data and metrics including financial accounting metrics, tax accounting metrics, overhead cost control metrics, etc. Modifying an accounting database system further to include environmental and indirect data for generating accurate carbon footprint metrics would be technically challenging and risks reducing the effectiveness of financial account database system at the complex tasks to which they are already optimized.

To address these and other technical problems, various examples described herein generate carbon footprint metrics in the manner described herein utilizing a web-based analytics system, such as the SAP Analytics Cloud (SAC) available from SAP SE of Walldorf, Germany. The web-based analytics system is in communication with multiple different data sources including, for example, a local database system, a cloud-implemented database system, a local file, etc. One or more of the data sources accessed by the web-based analytics system can include a database system including a universal journal table and an environmental compliance database system.

The web-based analytics system imports quantity structure data describing a first product or service from an accounting system database (e.g., an accounting system table thereof). The quantity structure data describes the constituent components and activities that are directly consumed to provide the good or service including, for example, BOM data describing constituent components that are used to make the product or service, manufacturing data describing manufacturing activities that are performed to generate the product or service, etc. Using the quantity structure data, the web-based analytics system imports carbon footprint data for the constituent components of the product.

The web-based analytics system also imports indirect carbon data from an environmental compliance system. The indirect carbon footprint data can include, for example, HVAC, lighting, and other costs from a plant or facility where the product is manufactured. The web-based analytics system utilizes the quantity structure data, the carbon footprint data for constituent components, and indirect carbon footprint data to determine a carbon footprint metric. The carbon footprint metric may be, for example, a carbon footprint per unit produced. The web-based analytics system may also be configured to generate other carbon footprint metrics such as a total financial impact of the product, where the total financial impact consider the carbon footprint per unit produced, the quantity of units produced, and a carbon dioxide or carbon dioxide equivalent cost.

FIG. 1 is a diagram showing one example of an environment 100 for generating carbon footprint metrics using distributed database systems. The environment 100 includes a web-based analytics system 102. The web-based analytics system 102 can be implemented using any suitable computing device or set of computing devices. In some examples, the web-based analytics system 102 includes one or more servers located at a single geographic location or distributed across multiple geographic locations. The web-based analytics system 102, in some examples, includes a database system 104, such as a HANA or S/4 HANA system available from SAP SE of Walldorf, Germany.

The web-based analytics system 102 may be in communication with various other data sources via different types of connections. For example, the web-based analytics system 102 may be in communication with a cloud database system 106. The cloud database system 106 may be implemented using one or more computing devices, such as servers, at a single geographic location or distributed across multiple geographic locations. The web-based analytics system 102 can also be in communication with other types of data sources such as for example, one or more files 108, one or more locally-implemented database systems 110, 112, etc. Files 108 may include spreadsheet, locally-stored databases, or any other suitable files.

The data sources 106, 108, 110, 112 can include various different types of direct or indirect carbon footprint data. For example, one or more of the data sources 106, 108, 110, 112 may be or be associated with an accounting system and may include one or more accounting system tables including quantity structure data. In some examples, one or more of the data sources 106, 108, 110, 112 may be or include an accounting database system including a universal journal table, as described herein.

Also, in some examples, one or more of the data sources 106, 108, 110, 112 may be environmental compliance database systems including indirect carbon footprint data, as described herein. An example database system for environmental compliance is the Environment Health and Safety Management system available from SAP SE of Walldorf, Germany.

Different data sources 106, 108, 110, 112 may connect to the web-based analytics system 102 in different ways. For example, the cloud database system 106 may connect to the analytics system 102 via a wide area network (WAN), such as the Internet. Files 108 may be connected to the web-based analytics system 102 directly via a communications network such at the Internet and/or via a local file server 116. In some examples, the web-based analytics system 102 is configured to access a universal resource locator (URL) associated with one or more files 108 including direct or indirect carbon footprint data via a WAN. In another example, the web-based analytics system 102 is configured to access a file server 116, where the file server 116 and the files 108 are stored at a common local area network (LAN). The web-based analytics system 102 connects to the file server 116 via a WAN and a cloud connector 118, such as the Cloud Platform Cloud Connector available from SAP SE of Walldorf, Germany. The file server 116, in turn, retrieves data from the files 108 via the LAN and provides it to the web-based analytics system 102 via the WAN.

FIG. 1 also shows two example ways that the web-based analytics system 102 can connect to database systems 110, 112 that are present on a LAN. In some examples, the web-based analytics system 102 connects to a database system 112 utilizing a cloud connector 118. For example the cloud connector 118 is configured to communicate with the web-based analytics system 102 via a WAN and with the database system 112 via a LAN. The cloud connector 112 configures communication between the web-based analytics system 102 and the database system 112. In some examples, a cloud agent 114, such as the Analytics Cloud Agent available from SAP SE of Walldorf, Germany is positioned between a database system 110 and the cloud connector 118 to facilitate communications between the database system 110 and the web-based analytics system 102.

The web-based analytics system 102 is configured to import quantity structure data 130 for a product from an accounting system table. The accounting system table can be stored at any of the data sources 106, 108, 110, 112 described herein. In some examples, the accounting system table is a universal journal table stored at a database system 110, 112 that is optimized for financial accounting, as described herein.

As described herein, the quantity structure data 130 describes constituent components and activities that are consumed to provide a good or service. For example, quantity structure data 130 can include BOM data describing the BOM for a good. Quantity structure data may also include routing data. Routing data describes activities to be performed on a product during manufacture. For example, routing data may describe the location of an activity, a machine or machines used to perform the activity, an amount of time that a workpiece is on the machine or machines to perform the activity, a number of human hours needed to perform the activity, etc.

The web-based analytics system 102 uses the quantity structure data 130 to identify and import direct carbon footprint data 132. Direct carbon footprint data 132 describes a carbon footprint directly attributable to the constituent components and activities identified by the quantity structure data 130. For a constituent component, direct carbon footprint data 132 can describe the carbon footprint of the sub-component. Consider an example in which the considered product is an electric motor having a rotor, a stator, electrical connectors, and an enclosure. Each constituent component e.g., the rotor, stator, electrical connectors, and enclosure) has an associated carbon footprint indicating greenhouse gasses or greenhouse gas equivalent emitted in producing the constituent component. Carbon footprints for constituent components, in some examples, are reported by the manufacturers of the constituent components and may be stored, for example, at an accounting system table and/or at an environmental compliance database.

The web-based analytics system 102 may import carbon footprint data for activities indicated by the quantity structure data. For example, the web-based analytics system 102 may import data describing the number of machine-hours and/or man-hours for performing an activity. This data may be found, for example, as costing data stored at an accounting system table. The web-based analytics system 102 may also import data describing the carbon footprint associated with one machine-hour or man-hour of the activity. The carbon footprint may take into account greenhouse gasses emitted by the activity itself.

In some examples, an activity involves working a workpiece using a machine. The workpiece may be a constituent component of the product and/or the result of a previous activity worked on a constituent component of the product. The web-based analytics system 102 may import from the accounting database system work time data describing an amount of time that the workpiece is worked on the machine to perform the activity. The carbon footprint for the activity may be the amount of work time to complete the activity multiplied by a machine-hour carbon footprint of the machine.

The web-based analytics system 118 may also consider indirect carbon footprint data 134. The indirect carbon footprint 118 describes, for example, greenhouse gas emissions that are not directly associated with the constituent components and/or activities for generating a product, such as plant overhead including HVAC expenses, lighting expenses, maintenance expenses, etc.

The web-based analytics system 118 utilizes the quantity structure data 130, the direct carbon footprint data 132 and the indirect carbon footprint data 134 to generate one or more carbon footprint metrics describing the products. Carbon footprint metrics can include, for example, a carbon footprint per unit of a product, an overall carbon footprint for the product, a total financial impact of the product, etc.

Results of the web-based analytics system 102 including, for example, carbon footprint metrics for one or more products, can be provided to a user 124 via one or more client applications 128A, 128B, 128N. In the example of FIG. 1, the user 124 executes a client application 128A on a user computing device 126. The user computing device 126 may be or include any suitable computing device including, for example, a tablet computer, a mobile telephone, a laptop computer, etc. The client application 128A provides the user 124 with a user interface 122 that includes various carbon footprint metrics determined as described herein. In this way, the user 124 can access the web-based analytics system 102 to receive carbon footprint metrics generated with data from one or more of the data sources 106, 108, 110, 112 without the need to modify the data sources 106, 108, 110, 112 or directly access the data sources 106, 108, 110, 112.

Figure 2:
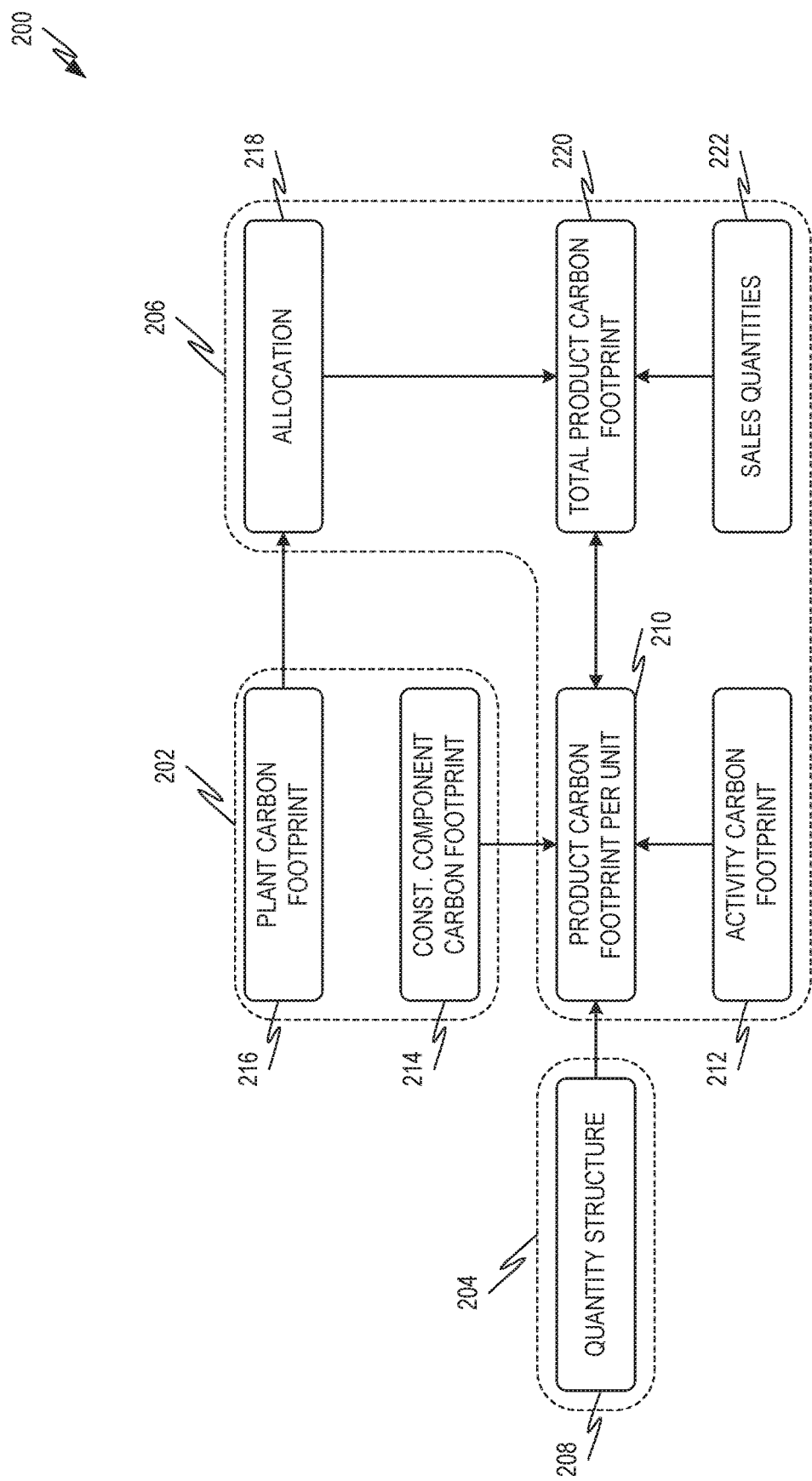
FIG. 2 is a diagram illustrating one example way for the web-based analytics system to generate carbon footprint metrics.

FIG. 2 is a diagram 200 illustrating one example way for the web-based analytics system 102 to generate carbon footprint metrics. The diagram 200 includes a web-based analytics system 206, an accounting database system 204, and an environmental compliance database system 202. The web-based analytics system 206 may be similar to the web-based analytics system 102 of FIG. 1. The accounting database system 204 may be a database system for financial accounting and may be implemented using one or more of the different types of data sources 106, 108, 110, 112 of FIG. 1. For example, the accounting database system 204 includes one or more accounting system tables including journal entries for financial transactions. In some examples, the accounting database system 204 includes a universal journal table.

The environmental compliance database system 202 may also be implemented using one or more of the different types of data sources 106, 108, 110, 112 of FIG. 1. The environmental compliance database system 202 may be separate from the accounting database system 202. Maintaining separation between the environmental compliance database system 202 and the accounting database system 204 provides certain technical advantages. For example, as described herein, the accounting database 204 may be optimized for accounting tasks including, for example, by the inclusion of a universal journal table.

The example of FIG. 2 shows the web-based analytics system 206 determining carbon foot metrics for a product including, a product carbon footprint per unit 210 and a total product carbon footprint 220. The web-based analytics system 206 imports quantity structure data 208 from the accounting database system 104. For example, the quantity structure data 208 may be imported from an accounting system table, such as a universal journal table. The web-based analytics system 206 may use the quantity structure data 208 to determine constituent components and activities for producing the product. The web-based analytics system 206 may import constituent component carbon footprint data 214 from the environmental compliance database system 202. The constituent component carbon footprint data 214 describes the greenhouse gas emissions generated to produce the various constituent components of the product.

The web-based analytics system 206 may determine activity carbon footprint data 212 for one or more activities indicated by the quantity structure data 208. In some examples, data for determining the activity carbon footprint data 212 is stored at a database system associated with the web-based analytics system 206, such as the database system 104 shown in FIG. 1. In other examples, activity carbon footprint data 212 is also imported from the environmental compliance system 202. Based on the activity carbon footprint data 212 and the constituent component carbon footprint data 214, the web-based analytics system 206 determines a product carbon footprint per unit 210. The product carbon footprint per unit indicates the greenhouse gasses generated to product one unit of the product.

FIG. 2 also shows the web-based analytics system 206 considering indirect carbon footprint information. For example, the web-based analytics system 206 receives plant carbon footprint data 216, for example, from the environmental compliance database system 202. The plant carbon footprint data 216 describes the indirect greenhouse gas emissions associated with generating the product including, for example, the greenhouse gas emissions associated with overhead at the plant (e.g., HVAC, lighting, maintenance, etc.). The web-based analytics system 206 generates allocation data 218 that allocates the plant carbon footprint data 216 to the product. For example, if the plant or other manufacturing facility at issue is used to manufacture multiple different products, then the allocation data 218 describes how the overhead carbon footprint of the plant will be allocated between different products at the plant. For example, the web-based analytics system 206 may determine a portion of the capacity of the plant used to generate each of the different products and assign a corresponding portion of the plant carbon footprint to each product.

In some examples, determining the allocation data 218 comprises determining a product ratio for the plant. The product ratio describes the portion of the capacity of a plant dedicated to the production of different products. Consider an example in which a plant makes three products, A, B, and C. If 30% of the capacity of the plant is used to generate product A, 50% of the capacity of the plant is used to generate product B, and 20% of the capacity of the plant is used to generate product C, the product ratio of the plant for A/B/C would be 30/50/20.

The use of allocation data 218 and plant carbon footprint data 216 can provide advantages in that the underlying carbon footprint metrics take account of plant-based efficiencies (or inefficiencies). For example, products manufactured at a plant having a high greenhouse gas overhead may have a higher actual carbon footprint than would be suggested by the constituent components and activities for generating the product.

The web-based analytics system 206 utilizes the allocation data and plant carbon footprint data 216 to generate a total product carbon footprint 220. In some examples, the web-based analytics system 206 imports sales quantity data 222, for example, from the accounting database system 204. The total product carbon footprint 220 may indicate, then the product carbon footprint per unit 210 multiple by the total quantity of the product that is sold (indicated by sales quantity data 222) and considering the plant carbon footprint data 216. In some examples, the web-based analytics system 206 considers the indirect carbon footprint data including, for example, the plant carbon footprint data 216 and allocation data 218 when finding the product carbon footprint per unit 210.

Figure 3:
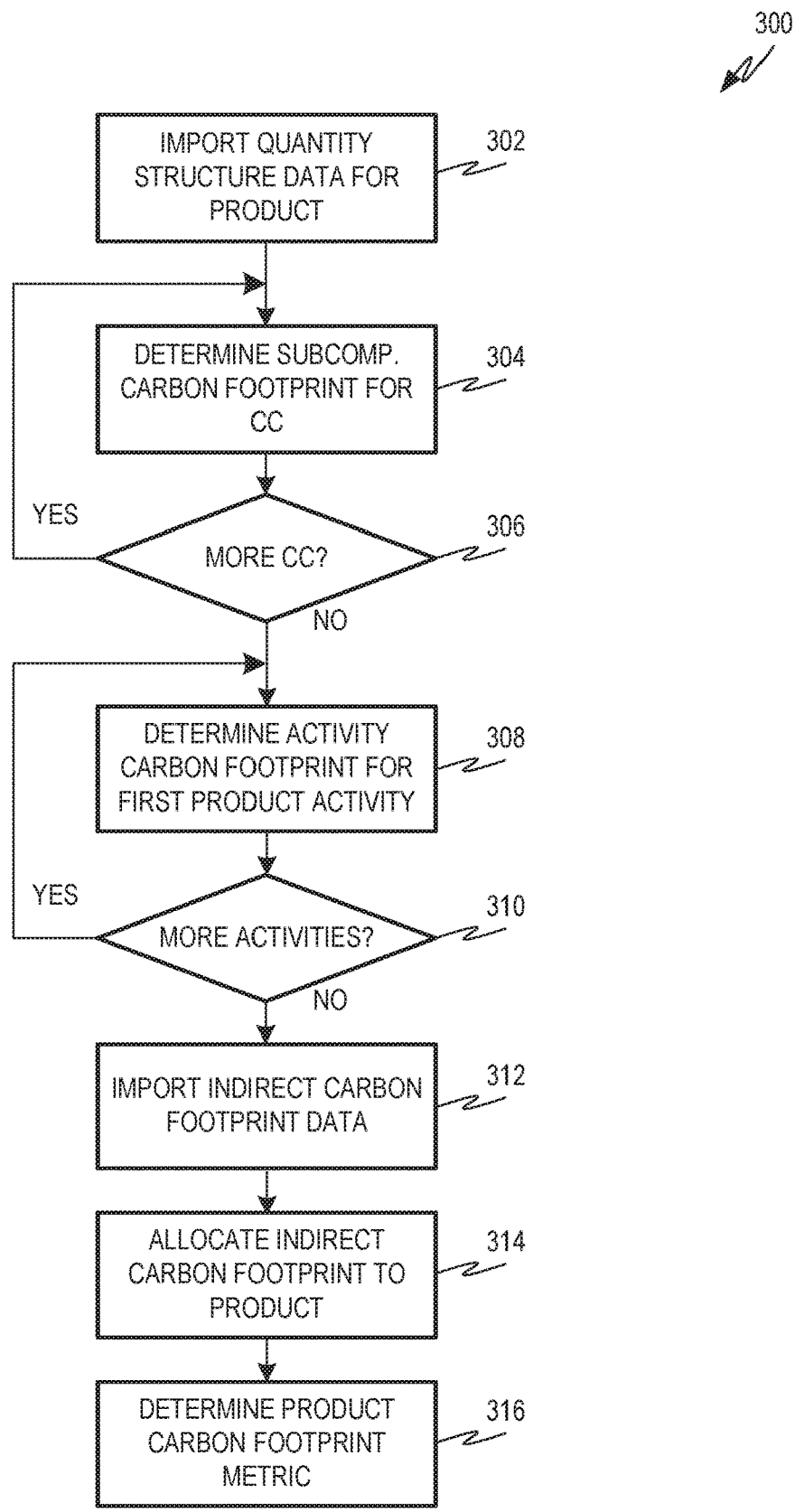
FIG. 3 is a flowchart showing one example of a process flow that may be executed by a web-based analytics system to determine a product carbon footprint.

FIG. 3 is a flowchart showing one example of a process flow 300 that may be executed by a web-based analytics system to determine a product carbon footprint. For example, the process flow 300 may be executed by the web-based analytics system 206 of FIG. 2 and/or the web-based analytics system 102 of FIG. 1. At operation 302, the web-based analytics system imports quantity structure data from an accounting system table, for example, at an accounting database system. In some examples, the accounting system table is a universal journal table.

At operation 304, the web-based analytics system determines a constituent component carbon footprint for a constituent component of the product. The constituent component may be identified, for example, utilizing the quantity structure data imported at operation 302. In some examples, determining the constituent component carbon footprint includes importing additional data, for example, from an environmental compliance database system, as described herein. At operation 306, the web-based analytics system determines if there are any additional constituent components in the product. If there are additional constituent components, the web-based analytics system finds the constituent component carbon footprint for the next constituent component at operation 304.

If there are no constituent components remaining at operation 306, the web-based analytics system, at operation 308, determines the activity carbon footprint for a first activity indicated by the quantity structure data. This may include, for example, importing from an environmental compliance database system data describing the activity including, for example, an amount of greenhouse gasses generated per machine-hour, per man-hour, or by another appropriate measure. At operation 310, the web-based analytics system determines if there are any other activities associated with the product (e.g., as indicated by the quantity structure data). If there are additional activities, the web-based analytics system finds the constituent component carbon footprint for the next activity at operation 308.

If there are no activities remaining at operation 310, the web-based analytics system, at operation 312, imports indirect carbon footprint data, for example, from an environmental compliance database system. The indirect carbon footprint data can include, for example, plant carbon footprint data 216 as described in FIG. 2. At operation 314, the web-based analytics system determines allocation data for allocating indirect carbon footprint data to the product, for example, as described herein. At operation 316, the web-based analytics system determines a carbon footprint metric for the product. The carbon footprint metric may be, for example a carbon footprint per unit, a total carbon footprint, or similar metric.

Figure 4:
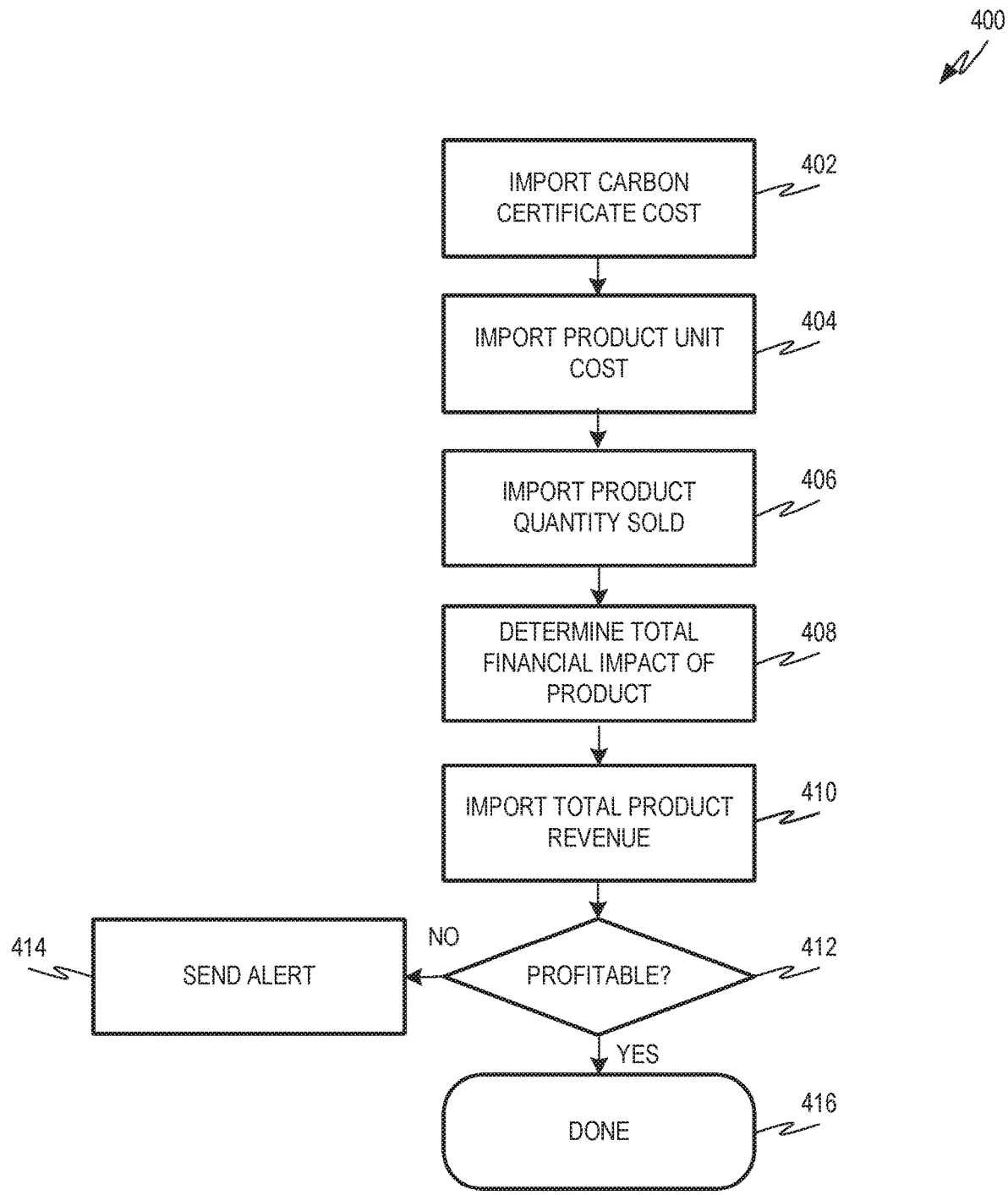
FIG. 4 is a flowchart showing one example of a process flow that can be executed by a web-based analytics system to determine a total financial impact of a product.

FIG. 4 is a flowchart showing one example of a process flow 400 that can be executed by a web-based analytics system to determine a total financial impact of a product. For example, the process flow 400 may be executed by the web-based analytics system 206 of FIG. 2 and/or the web-based analytics system 102 of FIG. 1. The process flow 400 may be executed, for example, after a carbon footprint per unit is determined for the product.

At operation 402, the web-based analytics system imports carbon certificate cost data. Carbon certificate cost data may be stored, for example, at the environmental compliance database system. Carbon certificate cost data indicates a cost for greenhouse gas emissions applied by governments of various jurisdictions. For example, carbon certificate cost data can indicate a cost per ton of carbon dioxide or the equivalent of a ton of carbon dioxide. The cost may be payable, for example, to the government entity implementing the carbon certificate. In some examples, carbon certificate costs can be different depending on the jurisdiction in which a product is manufactured.

At operation 404, the web-based analytics system imports product unit cost data. Product unit cost data indicates the cost of manufacturing one unit of the product. Product unit cost data can be uniform for all units of a product, or may vary, for example, based on where or when the product units are manufactured. Product unit cost data can be imported from the accounting database system and, for example, from a universal journal table. At operation 406, the web-based analytics system imports a quantity of the product sold over a time period (e.g., one year, one quarter, etc.). At operation 408, the web-based analytics system determines the total financial impact of the product. The total financial impact may indicate the total cost to the company of manufacturing the product. An example way to find the total financial impact is given by the equation below:

TotalFinancialImplact=Product Quantity Sold*(Product Unit Cost+(Product Unit Carbon Footprint*Carbon Certificate Cost))

The total financial impact of the product, as with other carbon footprint metrics described herein, can be provided to a user by the web-based analytics system via a client application.

In some examples, the process flow 400 continues beyond operation 408 to determine whether the product is profitable in view of the total financial impact. For example, at operation 410, the web-based analytics system imports a total product revenue, for example, from the accounting database system. At operation 412, the web-based analytics system determines if the product is profitable by comparing the total product revenue to the total financial impact of the product determined at operation 408. For example, if the total revenue is greater than the total financial impact, then the product may be profitable. In some examples, the web-based analytics system is configured to determine that a product is profitable only if the total product revenue is greater than the total financial impact of the product by more than a threshold value.

If the web-based analytics system determines that product is profitable at operation 412, then the process may conclude at operation 416. In some examples, an indication that the product is profitable is provided to a user via a client application and/or user interface, as described herein. If the web-based analytics system determines at operation 412 that the product is not profitable, the web-based analytics system may send an alert message to a user at operation 414. The alert message may be provided, for example, via a client application and user interface as described herein. The alert message may alert the user and, in some examples, includes one or more recommended actions for making the product profitable. Such recommended actions may include, for example, moving some or all of the production of the product to a plant with lower overhead, including a lower indirect carbon footprint, ceasing production of the product, etc.

Figure 5:
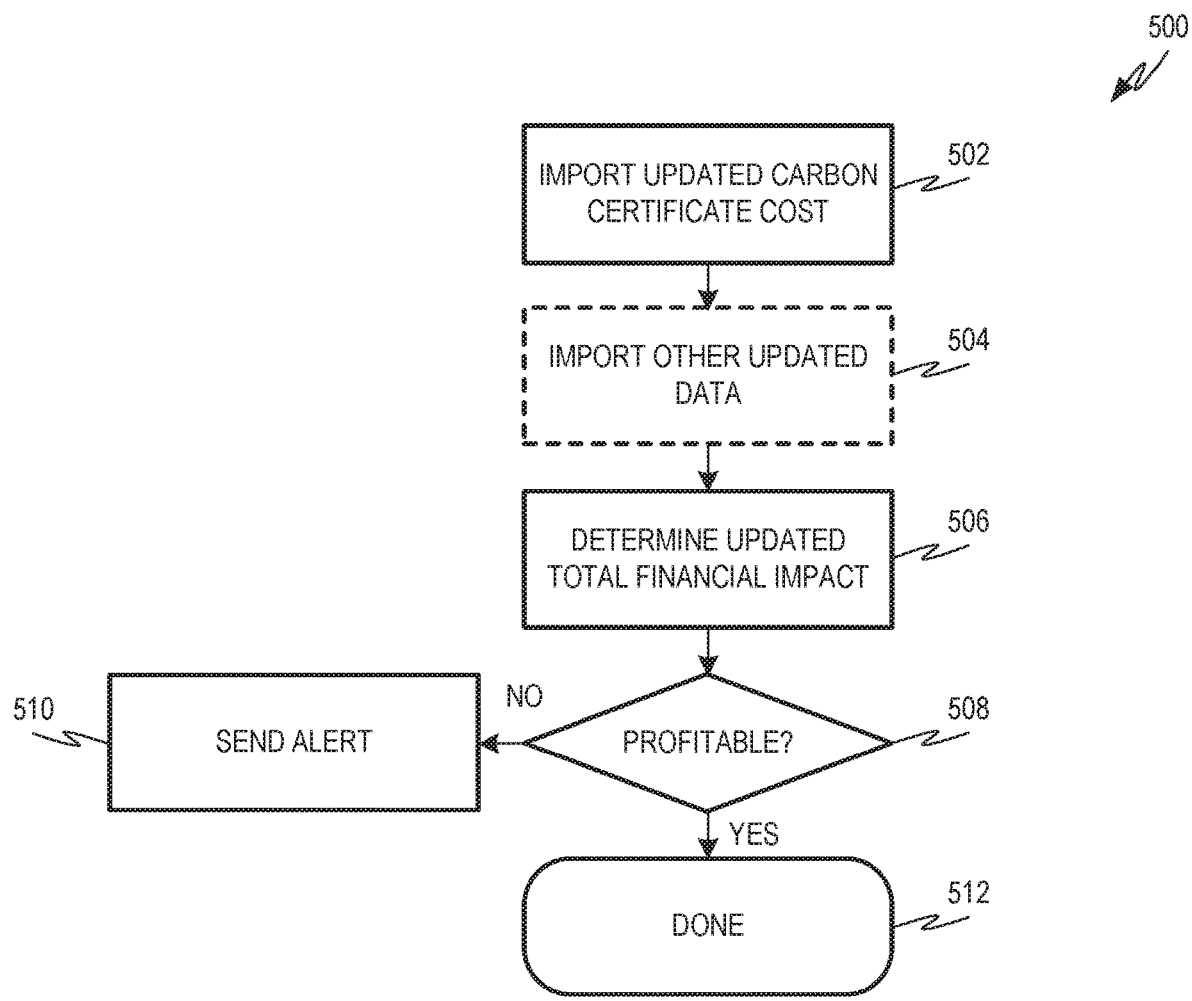
FIG. 5 is a flowchart showing one example of a process flow that may be executed by a web-based analytics system to update the total financial impact of a product.

FIG. 5 is a flowchart showing one example of a process flow 500 that may be executed by a web-based analytics system to update the total financial impact of a product. For example, the process flow 500 may be executed by the web-based analytics system 206 of FIG. 2 and/or the web-based analytics system 102 of FIG. 1. In some examples, the cost of carbon certificates may vary by time depending, for example, on actual greenhouse gas emissions, for example, across an economy. For example, the process flow 500 may be triggered when the web-based analytics system detects a change to the cost of a carbon certificate relevant to the product. In other examples, a user may request execution of the process flow 500.

At operation 502, the web-based analytics system imports carbon certificate cost change data indicated an updated carbon certificate cost. Optionally, at operation 504, the web-based analytics system imports other updated data such as, for example, updated product unit cost data, updated product quantity sold data, updated total product revenue, etc. At operation 506, the web-based analytics system generates updated total financial impact data using the updated data imported at operation 502 and optionally at operation 504.

At operation 508, the web-based analytics system determines if the product is profitable in view of the updated carbon certificate cost. If the web-based analytics system determines that product is profitable at operation 508, then the process may conclude at operation 516. In some examples, an indication that the product is profitable is provided to a user via a client application and/or user interface, as described herein. If the web-based analytics system determines at operation 508 that the product is not profitable, the web-based analytics system may send an alert message to a user at operation 512. The alert message may be provided, for example, via a client application and user interface as described herein.

Figure 6:
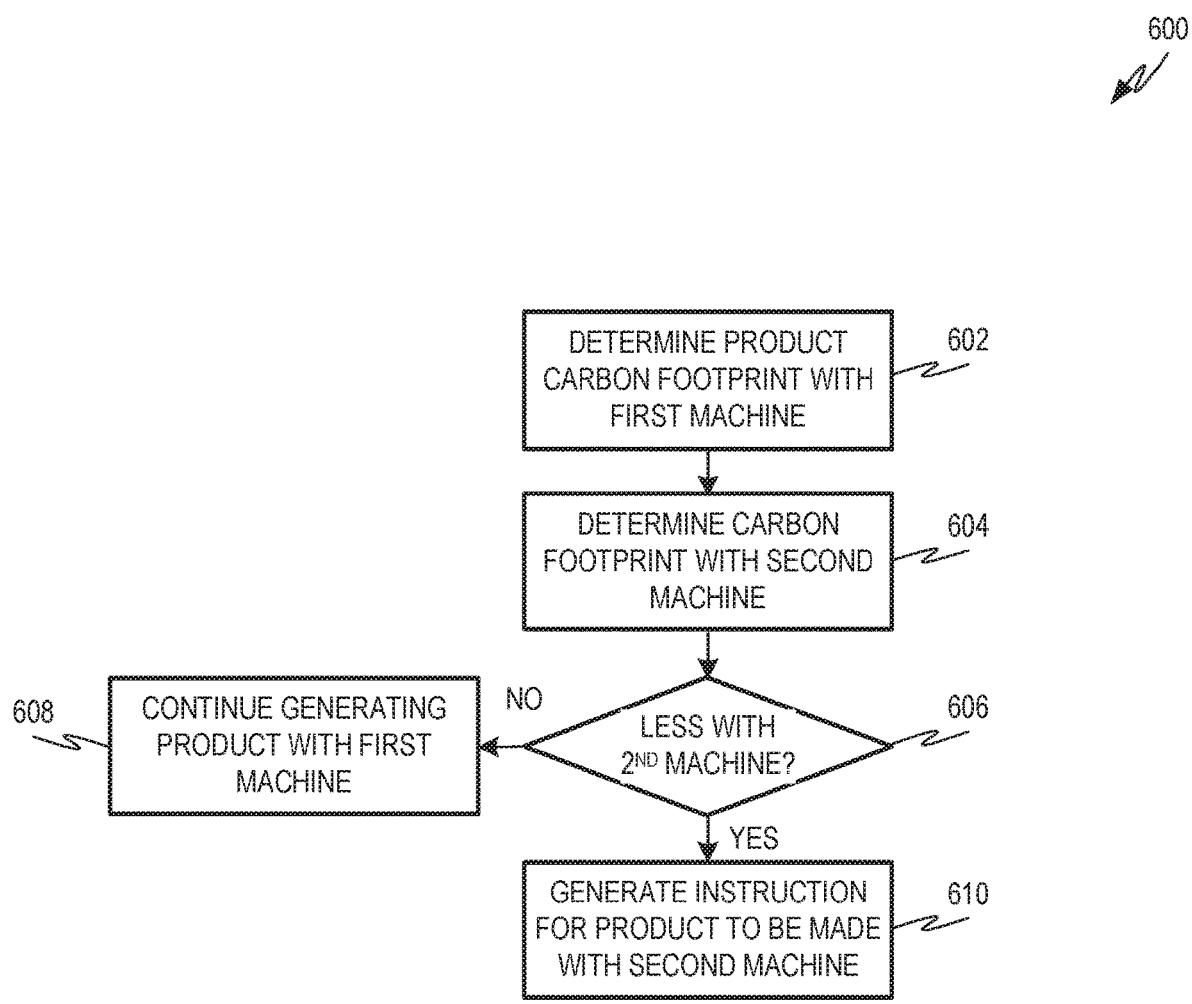
FIG. 6 is a flowchart showing one example of a process flow that may be executed by a web-based analytics system to direct the manufacturing of a product using carbon footprint metrics.

FIG. 6 is a flowchart showing one example of a process flow 600 that may be executed by a web-based analytics system to direct the manufacturing of a product using carbon footprint metrics. For example, the process flow 600 may be executed by the web-based analytics system 206 of FIG. 2 and/or the web-based analytics system 102 of FIG. 1. At operation 602, the web-based analytics system determines a first product carbon footprint metric with a first machine. For example, the first product carbon footprint metric is determined assuming that a first activity for generating the product is performed by a first machine. In some examples, the first machine is a machine presently used to generate the activity. The first product carbon footprint metric may be, for example, a product carbon footprint per unit, a total product carbon footprint, a total financial impact of the product considering a total product carbon footprint, or any other suitable metric generated, for example, as described herein.

At operation 604, the web-based analytics system determines a second carbon footprint metric with a second machine used to perform the first activity. In some examples, the second machine may be at the same plant as the first machine or a different plant. Also, in some examples, the second machine is at a different plant (e.g., a different plant having a different electricity source and, therefore, a different carbon footprint). In some examples, the second carbon footprint metric is determined by swapping more than one machine. For example, the first carbon footprint metric may be determined with all activities for generating the product at a first plant while the second carbon footprint metric may be determined with all activities for generating the product at a second plant different than the first plant. Also, in some examples, the web-based analytics system is configured to select machines for the activities indicated by the quantity structure data for a product so as to optimize (e.g., find the lowest) carbon footprint metric.

At operation 606, the web-based analytics system determines whether the second carbon footprint metric is less than the first carbon footprint metric. If the second carbon footprint metric is not less than the first carbon footprint metric (or not less by at least a threshold amount), then the product may continue to be generated with the first machine at operation 608. For example, the web-based analytics system may send a report or other message to a user indicating that the first carbon footprint metric is less than the second carbon footprint metric.

If the second carbon footprint metric is less than the first carbon footprint metric, the web-based analytics system, at operation 610, generates an instruction for the product to be generated with the second machine (or second set of machines) used to generate the second carbon footprint metric. That may include, for example, sending an e-mail or other electronic communication to a user, who may consider and, if desirable, implement the instruction. In another example, generating the instruction can include instructing one or more machines to direct constituent components of the product to the second machine for the indicated activity.

Figure 7:
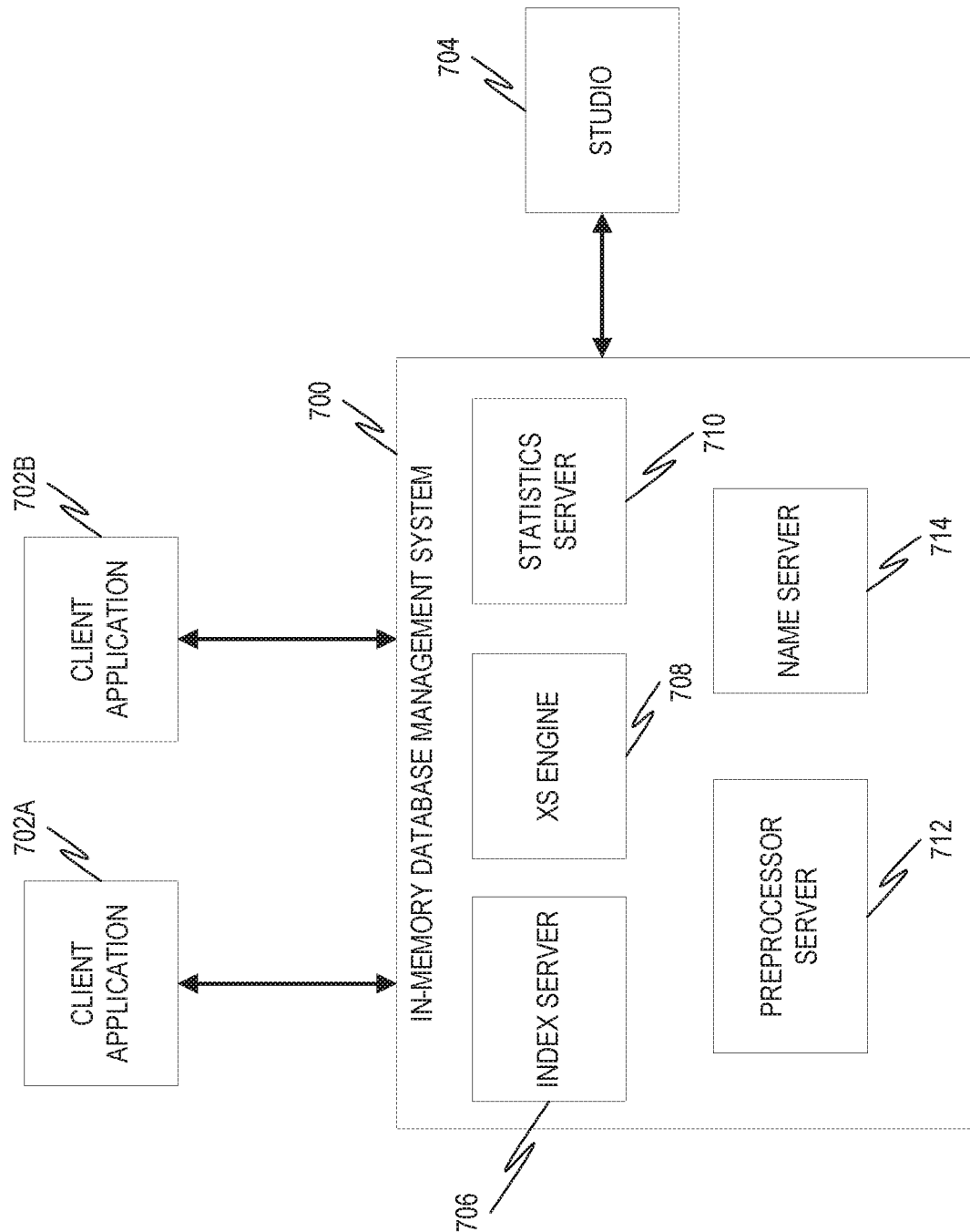
FIG. 7 is a diagram illustrating an example of in-memory database management system that may be used to implement table privilege management, for example, as described herein.

FIG. 7 is a diagram illustrating an example of an in-memory database management system 700. An in-memory database stores data primarily at main memory, such as a random access memory. This is different than databases that primarily employ a disk storage mechanism. In some examples, the database management system 700 may be or include an example of the HANA system from SAP SE of Walldorf, Germany. Although various features of carbon footprint optimization are described herein in the context of an in-memory database, carbon footprint optimization may be generally performed at any suitable database management system.

The in-memory database management system 700 can be used to implement various components described herein. In some examples, the in-memory database management system 700 can be optimized for financial accounting and may include a universal journal table, as described herein. In other examples, the in-memory database management system 700 can be optimized for storing environmental compliance data, as described herein. In some examples, the in-memory database management system 700 can be used to implement the web-based analytics system including, for example, internal storage thereof.

The in-memory database management system 700 may be coupled to one or more client applications 702A, 702B. Client applications 702A, 702B may perform operations similar to those of the client applications 128A, 128B, 128N of FIG. 1. For example, the client applications 702A, 702B may be used to access the web-based analytics system 102 to access carbon footprint metrics generated and provided as described herein. The client applications 702A, 702B may communicate with the in-memory database management system 700 through a number of different protocols, including Structured Query Language (SQL), Multidimensional Expressions (MDX), Hypertext Transfer Protocol (HTTP), Representational State Transfer (REST), Hypertext Markup Language (HTML).

FIG. 7 also shows a studio 704 that may be used to perform modeling by accessing the in-memory database management system 700. In some examples, the studio 704 may allow complex analysis to be performed on data drawn not only from real time event data and windows, but also from stored database information. In some examples, carbon footprint data may be generated by the studio as described herein.

The in-memory database management system 700 may comprise a number of different components, including an index server 706, an XS engine 708, a statistics server 710, a preprocessor server 712, and a name server 714. These components may operate on a single computing device or may be spread among multiple computing devices (e.g., separate servers). The index server 706 contains the actual data and the engines for processing the data. It may also coordinate and uses the other servers.

The XS engine 708 allows clients to connect to the in-memory database management system 700 using web protocols, such as Hypertext Transfer Protocol (HTTP). Although the XS engine 708 is illustrated as a component of the in-memory database management system 700, in some examples, the XS engine may be implemented as one or more Application Program interfaces (APIs) and/or services positioned between the client applications 702A, 702B and the in-memory database management system 700. In some examples, the XS engine 708 may handle client requests received in languages other than SQL such as, for example, Multidimensional Expressions (MDX), Hypertext Transfer Protocol (HTTP), Representational State Transfer (REST), Hypertext Markup Language (HTML), etc.

The statistics server 710 collects information about status, performance, and resource consumption from all the other server components. The statistics server 710 can be accessed from the studio 704 to obtain the status of various alert monitors.

The preprocessor server 712 is used for analyzing text data and extracting the information on which the text search capabilities are based.

The name server 714 holds information about the database topology. This is used in a distributed system with instances of the database on different hosts. The name server 714 knows where the components are running and which data is located on which server. In an example embodiment, a separate enqueue server may operate in the manner described above with respect to enqueue servers, specifically with regard to creating and managing light-weight enqueue sessions.

Figure 8:
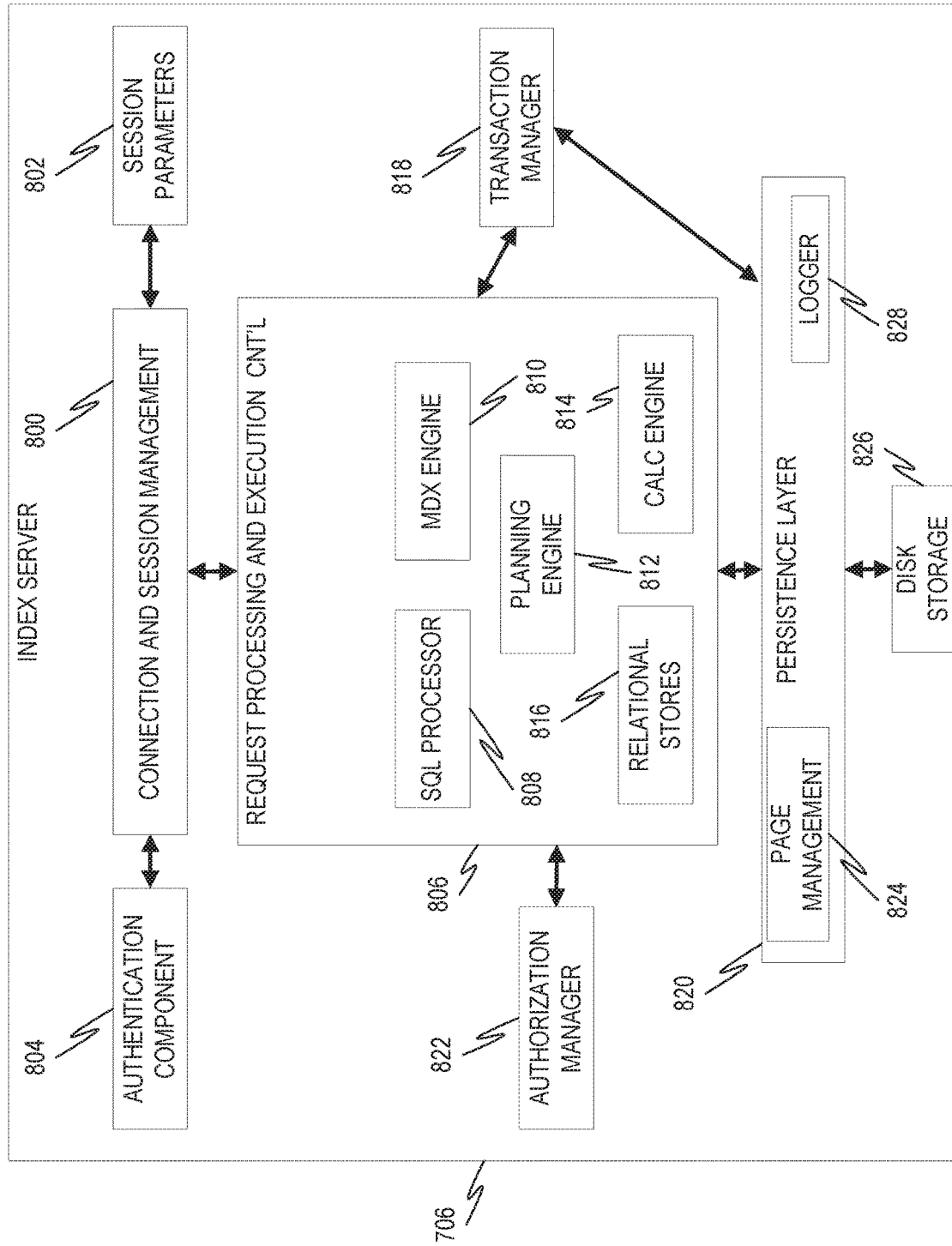
FIG. 8 is a diagram illustrating an example of an index server of the in-memory database management system of FIG. 7.

FIG. 8 is a diagram illustrating an example of the index server 706. Specifically, the index server 706 of FIG. 7 is depicted in more detail. The index server 706 includes a connection and session management component 800, which is responsible for creating and managing sessions and connections for the database clients (e.g. client applications 702A, 702B). Once a session is established, clients can communicate with the database system using SQL statements. For each session, a set of session parameters 802 may be maintained, such as auto-commit, current transaction isolation level, etc. Users (e.g., system administrators, developers) may be authenticated by the database system itself (e.g., by logging in with log-in information such as a user name and password, using an authentication component 804) or authentication can be delegated to an external authentication provider such as a Lightweight Directory Access Protocol (LDAP) directory.

Client requests, such as contract form requests, can be analyzed and executed by a set of components summarized as request processing and execution control 806. An SQL processor 808 checks the syntax and semantics of the client SQL statements and generates a logical execution plan. Multidimensional expressions (MDX) is a language for querying and manipulating multidimensional data stored in OLAP cubes. As such, an MDX engine 810 may be provided to allow for the parsing and executing of MDX commands. A planning engine 812 allows applications to execute basic planning operations in the database layer. One such operation is to create a new version of a dataset as a copy of an existing dataset, while applying filters and transformations.

A calculation engine 814 implements the various SQL script and planning operations. The calculation engine 814 creates a logical execution plan for calculation models derived from SQL script, MDX, planning, and domain-specific models. This logical execution plan may include, for example, breaking up a model into operations that can be processed in parallel. The data is stored in relational stores 816, which implement a relational database in main memory. Each SQL statement may be processed in the context of a transaction. New sessions are implicitly assigned to a new transaction. A transaction manager 818 coordinates database transactions, controls transactional isolation, and keeps track of running and closed transactions. When a transaction is committed or rolled back, the transaction manager 818 informs the involved engines about this event so they can execute needed actions. The transaction manager 818 also cooperates with a persistence layer 820 to achieve atomic and durable transactions.

An authorization manager 822 is invoked by other database system components to check whether the user has the specified privileges to execute the requested operations. The database system allows for the granting of privileges to users or roles. A privilege grants the right to perform a specified operation on a specified object.

The persistence layer 820 ensures that the database is restored to the most recent committed state after a restart and that transactions are either completely executed or completely undone. To achieve this goal in an efficient way, the persistence layer 820 uses a combination of write-ahead logs, shadow paging, and save points. The persistence layer 820 also offers a page management interface 824 for writing and reading data to a separate disk storage 826, and also contains a logger 828 that manages the transaction log. Log entries can be written implicitly by the persistence layer 820 when data is written via the persistence interface or explicitly by using a log interface.

Figure 9:
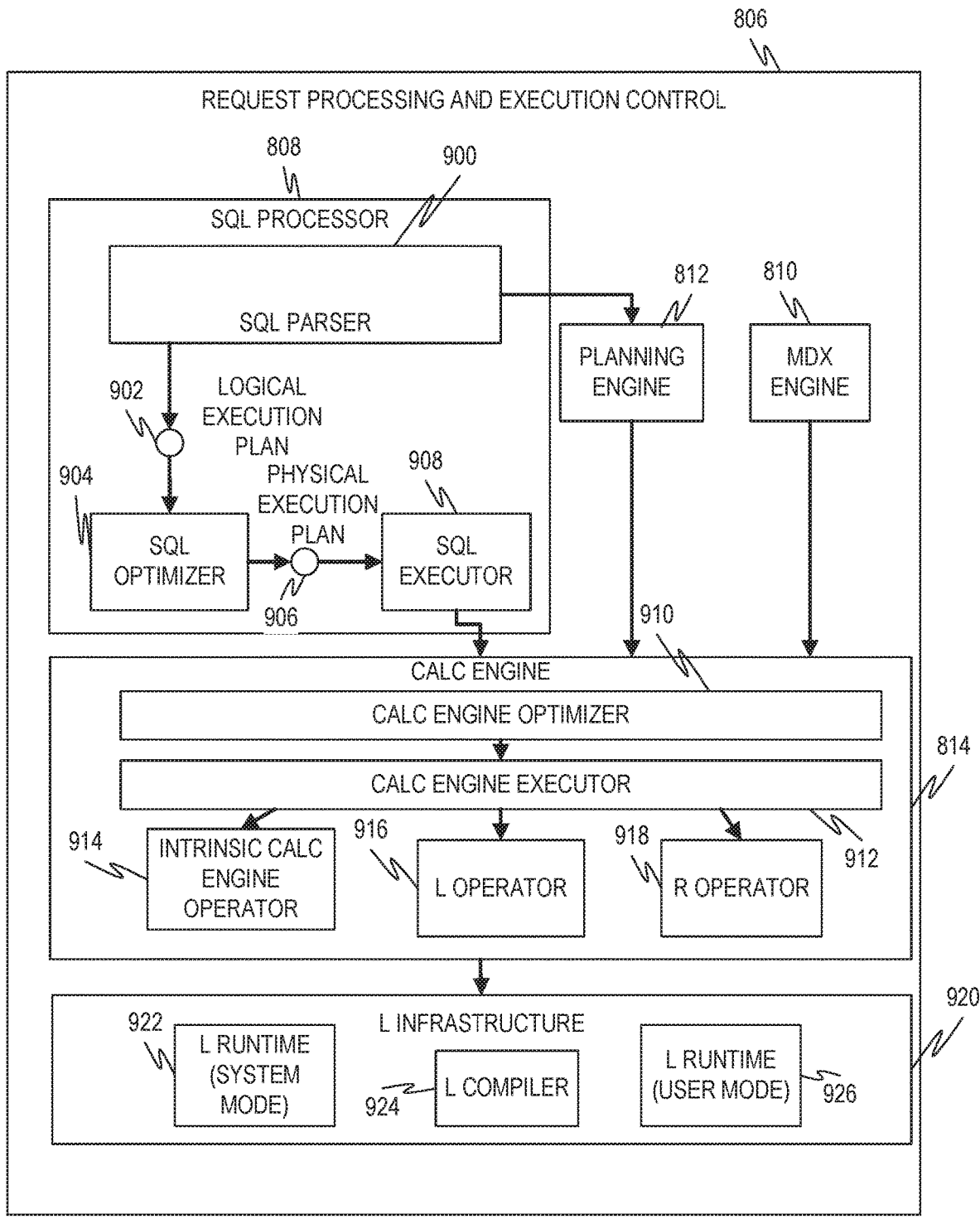
FIG. 9 is a diagram illustrating one example of the request processing and execution control of the database management system of FIG. 7.

FIG. 9 is a diagram illustrating one example of the request processing and execution control 806. This diagram depicts the request processing and execution control 806 of FIG. 8 in more detail. The SQL processor 808 contains an SQL parser 900, which parses the SQL statement and generates a logical execution plan 902, which it passes to an SQL optimizer 904. The SQL optimizer 904 optimizes the logical execution plan 902 and converts it to a physical execution plan 906, which it then passes to a SQL executor 908. The calculation engine 814 implements the various SQL script and planning operations, and includes a calc engine optimizer 910, which optimizes the operations, and a calc engine executor 912, which executes the operations, as well as an intrinsic calc engine operator 914, an L operator 916, and an R operator 918.

An L infrastructure 920 includes a number of components to aid in the running of L procedures, including an L-runtime (system mode) 922, an L compiler 924, and an L-runtime (User mode) 926.

EXAMPLES

Example 1 is a web-based analytics system for using a plurality of data sources to determine a carbon footprint metric for a product, the web-based analytics system comprising: at least one processor programmed to perform operations comprising: accessing indirect carbon footprint data from an environmental compliance system; accessing quantity structure data describing the product from an accounting system table; identifying, using the quantity structure data, a first constituent component for the product; accessing first constituent component carbon footprint data for the first constituent component; identifying, by the web-based analytics system and using the quantity structure data, an activity for the product; accessing, by the web-based analytics system, activity carbon footprint data describing a carbon footprint for the activity; and determining, by the web-based analytics system, the carbon footprint metric for the product using the first constituent component carbon footprint data, the activity carbon footprint data, and the indirect carbon footprint data.

In Example 2, the subject matter of Example 1 optionally includes wherein the accounting system table is a universal journal table.

In Example 3, the subject matter of any one or more of Examples 1-2 optionally includes the operations further comprising: determining, by the web-based analytics system, a product ratio for a production site, the product ratio describing a portion of a capacity of the production site used to produce the product and a portion of the capacity of the production site used to produce a second product, wherein the carbon footprint metric for the product is also based on the product ratio for the production site.

In Example 4, the subject matter of any one or more of Examples 1-3 optionally includes wherein the accounting system table comprises financial accounting data and product costing data.

In Example 5, the subject matter of any one or more of Examples 1-4 optionally includes the operations further comprising: accessing, by the web-based analytics system, a carbon certificate cost from the environmental compliance system; accessing, by the web-based analytics system, a product unit cost for the product from the accounting system table; accessing, by the web-based analytics system, a quantity of the product sold; and determining, by the web-based analytics system, a financial impact of the product using the carbon footprint metric for the product, the quantity of the product sold, and the product unit cost.

In Example 6, the subject matter of Example 5 optionally includes the operations further comprising: accessing, by the web-based analytics system, carbon certificate cost change data from the environmental compliance system, the carbon certificate cost change data describing a change to the carbon certificate cost; determining, by the web-based analytics system, an updated financial impact of the product using the carbon certificate cost change data; determining, by the web-based analytics system, that the product is not profitable using the updated financial impact; and sending an alert message to a first user via a user interface, the alert message indicating that the product is not profitable.

In Example 7, the subject matter of any one or more of Examples 1-6 optionally includes wherein the activity comprises working a workpiece on a first machine, wherein the workpiece is included in the product, and wherein the activity carbon footprint data comprises a carbon footprint per unit time for the first machine, the operations further comprising: accessing, from the accounting system table, work time data describing a work time for the workpiece; and determining a carbon footprint for the activity using the carbon footprint per unit time for the work time and the work time for the workpiece.

In Example 8, the subject matter of any one or more of Examples 1-7 optionally includes wherein the activity carbon footprint data comprises production carbon metric data for performing the activity using a first machine and second production carbon metric data for performing the activity using a second machine, the web-based analytics system the operations further comprising: determining that the carbon metric data for performing the activity using the first machine is less than the carbon metric data for performing the activity using the second machine; and instructing the first machine to perform the activity.

In Example 9, the subject matter of any one or more of Examples 1-8 optionally includes wherein accessing the quantity structure data comprises copying the accounting system table to an in-memory database of the web-based analytics system.

Example 10 is a method for using a plurality of data sources to determine a carbon footprint metric for a product, the method comprising: accessing by a web-based analytics system, indirect carbon footprint data from an environmental compliance system; accessing, by the web-based analytics system, quantity structure data describing the product from an accounting system table; identifying, by the web-based analytics system and using the quantity structure data, a first constituent component for the product; accessing, by the web-based analytics system, first constituent component carbon footprint data for the first constituent component; identifying, by the web-based analytics system and using the quantity structure data, an activity for the product; accessing, by the web-based analytics system, activity carbon footprint data describing a carbon footprint for the activity; and determining, by the web-based analytics system, the carbon footprint metric for the product using the first constituent component carbon footprint data, the activity carbon footprint data, and the indirect carbon footprint data.

In Example 11, the subject matter of Example 10 optionally includes wherein the accounting system table is a universal journal table.

In Example 12, the subject matter of any one or more of Examples 10-11 optionally includes determining, by the web-based analytics system, a product ratio for a production site, the product ratio describing a portion of a capacity of the production site used to produce the product and a portion of the capacity of the production site used to produce a second product, wherein the carbon footprint metric for the product is also based on the product ratio for the production site.

In Example 13, the subject matter of any one or more of Examples 10-12 optionally includes wherein the accounting system table comprises financial accounting data and product costing data.

In Example 14, the subject matter of any one or more of Examples 10-13 optionally includes accessing, by the web-based analytics system, a carbon certificate cost from the environmental compliance system; accessing, by the web-based analytics system, a product unit cost for the product from the accounting system table; accessing, by the web-based analytics system, a quantity of the product sold; and determining, by the web-based analytics system, a financial impact of the product using the carbon footprint metric for the product, the quantity of the product sold, and the product unit cost.

In Example 15, the subject matter of Example 14 optionally includes accessing, by the web-based analytics system, carbon certificate cost change data from the environmental compliance system, the carbon certificate cost change data describing a change to the carbon certificate cost; determining, by the web-based analytics system, an updated financial impact of the product using the carbon certificate cost change data; determining, by the web-based analytics system, that the product is not profitable using the updated financial impact; and sending an alert message to a first user via a user interface, the alert message indicating that the product is not profitable.

In Example 16, the subject matter of any one or more of Examples 10-15 optionally includes wherein the activity comprises working a workpiece on a first machine, wherein the workpiece is included in the product, and wherein the activity carbon footprint data comprises a carbon footprint per unit time for the first machine, further comprising: accessing, from the accounting system table, work time data describing a work time for the workpiece; and determining a carbon footprint for the activity using the carbon footprint per unit time for the work time and the work time for the workpiece.

In Example 17, the subject matter of any one or more of Examples 10-16 optionally includes wherein the activity carbon footprint data comprises production carbon metric data for performing the activity using a first machine and second production carbon metric data for performing the activity using a second machine, the method further comprising: determining that the carbon metric data for performing the activity using the first machine is less than the carbon metric data for performing the activity using the second machine; and instructing the first machine to perform the activity.

In Example 18, the subject matter of any one or more of Examples 10-17 optionally includes wherein accessing the quantity structure data comprises copying the accounting system table to an in-memory database of the web-based analytics system.

Example 19 is a non-transitory machine-readable medium comprising instructions thereon that, when executed by at least one processor, causes the at least one processor to execute operations comprising: accessing by a web-based analytics system, indirect carbon footprint data from an environmental compliance system; accessing, by the web-based analytics system, quantity structure data describing a product from an accounting system table; identifying, by the web-based analytics system and using the quantity structure data, a first constituent component for the product; accessing, by the web-based analytics system, first constituent component carbon footprint data for the first constituent component; identifying, by the web-based analytics system and using the quantity structure data, an activity for the product; accessing, by the web-based analytics system, activity carbon footprint data describing a carbon footprint for the activity; and determining, by the web-based analytics system, the carbon footprint metric for the product using the first constituent component carbon footprint data, the activity carbon footprint data, and the indirect carbon footprint data.

In Example 20, the subject matter of Example 19 optionally includes the operations further comprising: determining, by the web-based analytics system, a product ratio for a production site, the product ratio describing a portion of a capacity of the production site used to produce the product and a portion of the capacity of the production site used to produce a second product, wherein the carbon footprint metric for the product is also based on the product ratio for the production site.

Figure 10:
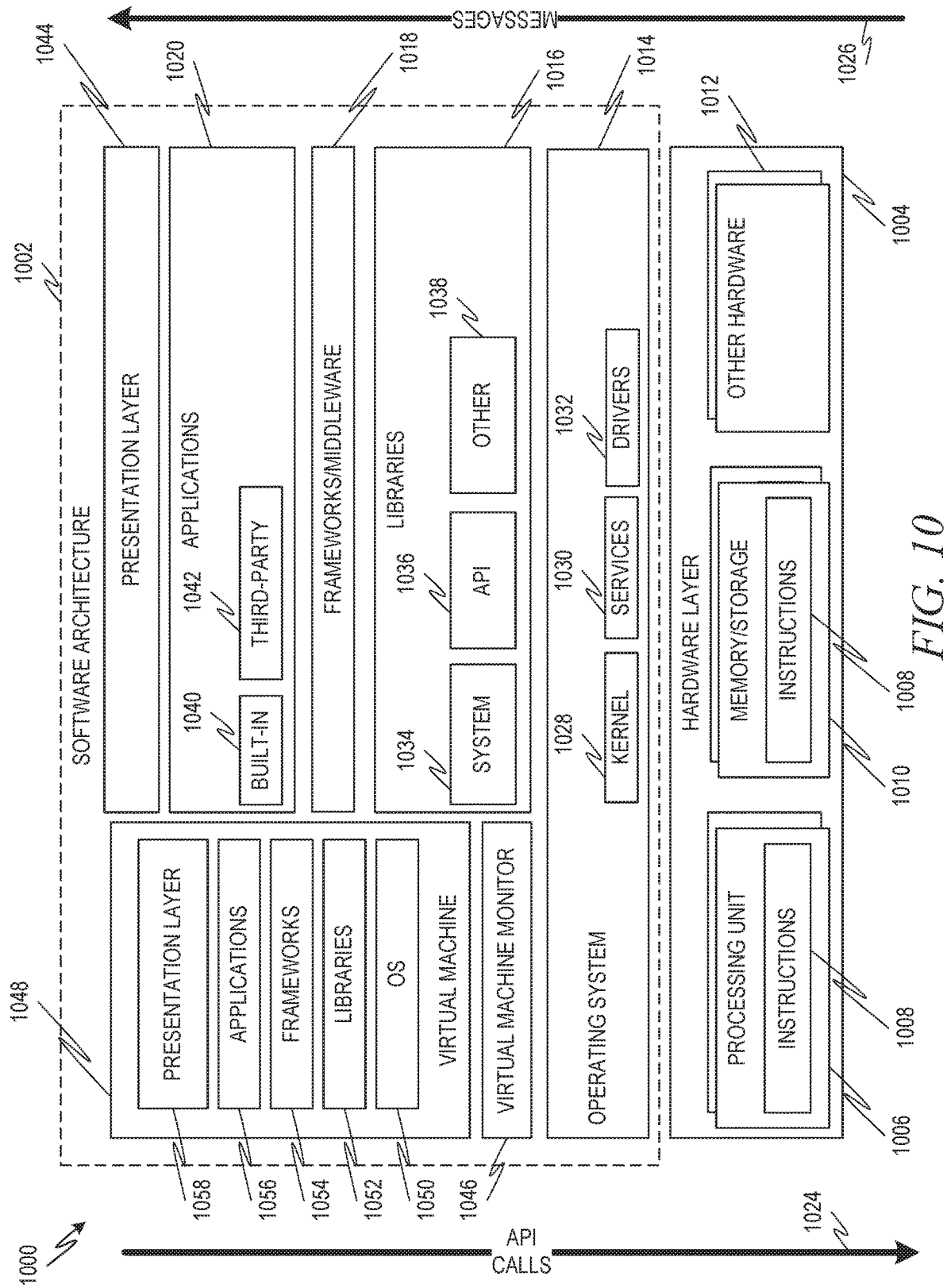
FIG. 10 is a block diagram showing one example of a software architecture for a computing device.

FIG. 10 is a block diagram 1000 showing one example of a software architecture 1002 for a computing device. The architecture 1002 may be used in conjunction with various hardware architectures, for example, as described herein. FIG. 10 is merely a non-limiting example of a software architecture and many other architectures may be implemented to facilitate the functionality described herein. A representative hardware layer 1004 is illustrated and can represent, for example, any of the above referenced computing devices. In some examples, the hardware layer 1004 may be implemented according to the architecture of the computer system of FIG. 10.

The representative hardware layer 1004 comprises one or more processing units 1006 having associated executable instructions 1008. Executable instructions 1008 represent the executable instructions of the software architecture 1002, including implementation of the methods, modules, subsystems, and components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the architecture 1002.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020 and presentation layer 1044. Operationally, the applications 1020 and/or other components within the layers may invoke application programming interface (API) calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a frameworks/middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with the underlying operating system 1014 functionality (e.g., kernel 1028, services 1030 and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 10D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be utilized by the applications 1020 and/or other software components/modules. For example, the frameworks 1018 may provide various graphic user interface (GUI) functions, high-level resource management, high-level location services, and so forth. The frameworks 1018 may provide a broad spectrum of other APIs that may be utilized by the applications 1020 and/or other software components/modules, some of which may be specific to a particular operating system or platform.

The applications 1020 includes built-in applications 1040 and/or third party applications 1042. Examples of representative built-in applications 1040 may include, but are not limited to, a contacts application, a browser application, a book reader application, a location application, a media application, a messaging application, and/or a game application. Third party applications 1042 may include any of the built in applications as well as a broad assortment of other applications. In a specific example, the third party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 1042 may invoke the API calls 1024 provided by the mobile operating system such as operating system 1014 to facilitate functionality described herein.

The applications 1020 may utilize built in operating system functions (e.g., kernel 1028, services 1030 and/or drivers 1032), libraries (e.g., system 1034, APIs 1036, and other libraries 1038), frameworks/middleware 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine as well as the interface with the host operating system (i.e., operating system 1014). A software architecture executes within the virtual machine such as an operating system 1050, libraries 1052, frameworks/middleware 1054, applications 1056 and/or presentation layer 1058. These layers of software architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
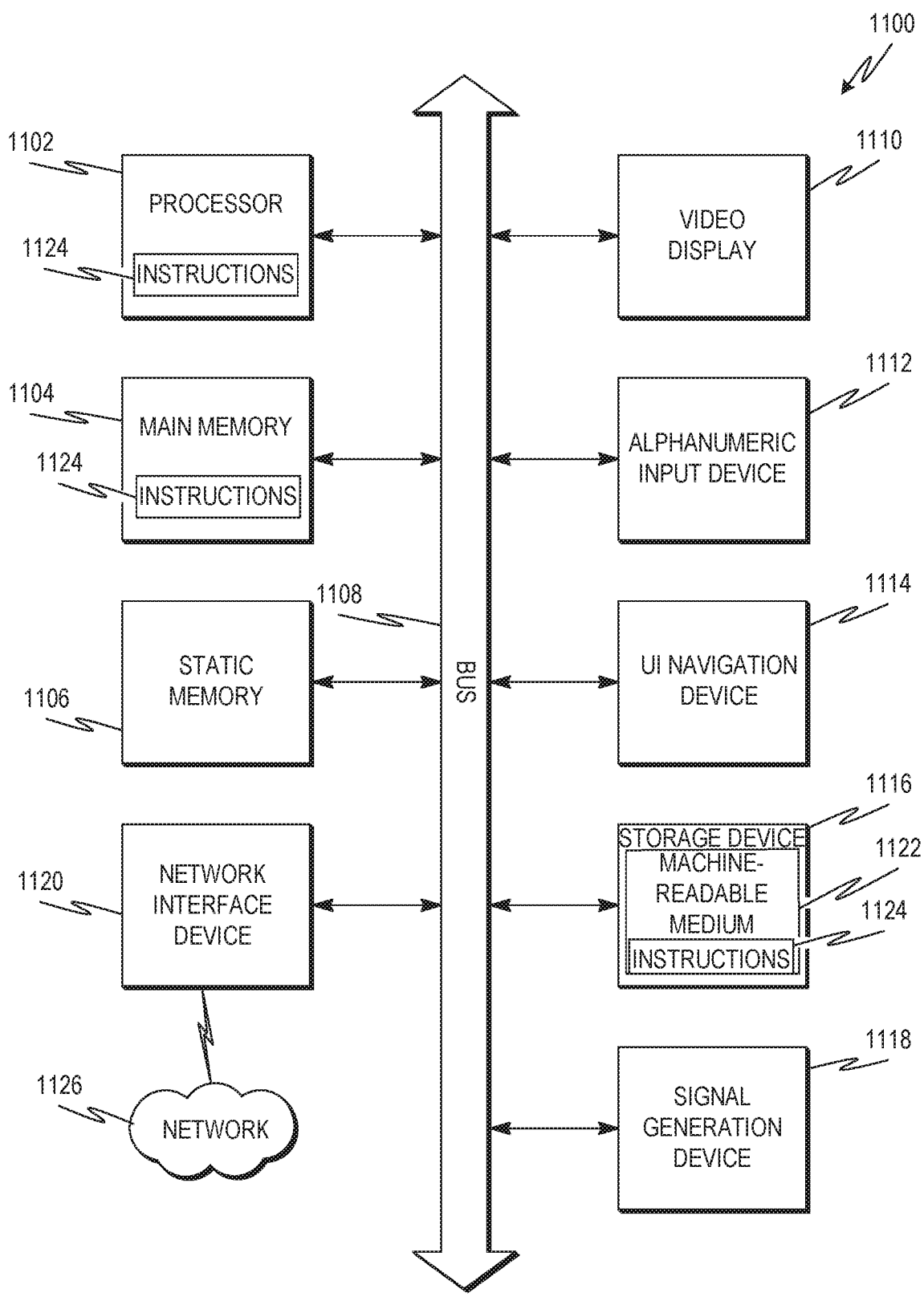
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 e.g., a keyboard or a touch-sensitive display screen), a user interface (UI) navigation (or cursor control) device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media 1122.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media 1122 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A web-based analytics system for using a plurality of data sources to determine a carbon footprint metric for a product, the web-based analytics system comprising:
    at least one processor programmed to perform operations comprising:
        importing, by the web-based analytics system, indirect carbon footprint data from an environmental compliance database system, the environmental compliance database system being distinct from the web-based analytics system;
        importing, by the web-based analytics system, quantity structure data describing the product from a universal journal table of an accounting database system the accounting database system being an in-memory database management system distinct from the web-based analytics system, a set of columns of the universal journal table describing the quantity structure data being stored at a random-access memory (RAM) of the accounting database system;
        identifying, by the web-based analytics system and using the quantity structure data, a first constituent component for the product;
        importing, by the web-based analytics system, first constituent component carbon footprint data for the first constituent component;
        identifying, by the web-based analytics system and using the quantity structure data, an activity for the product;
        importing, by the web-based analytics system, activity carbon footprint data describing a carbon footprint for the activity, the activity comprising performing at least one operation on a physical workpiece and the activity carbon footprint data describing a machine-hour carbon footprint of the at least one operation at a first machine and a duration of the at least one operation at the first machine;
        determining, by the web-based analytics system, the carbon footprint metric for the product using the first constituent component carbon footprint data, the activity carbon footprint data, and the indirect carbon footprint data;
        determining, by the web-based analytics system, an alternate carbon footprint metric for the product using the first constituent component carbon footprint data, the indirect carbon footprint data, and second activity carbon footprint data describing performance of the carbon footprint for the activity with a second machine; and
        based on the alternate carbon footprint metric being less than the carbon footprint metric, sending an instruction by the web-based analytics system to at least one machine, the instruction causing the at least one machine to direct constituent components of the product to the second machine for performance of the activity.

2. The web-based analytics system of claim 1, the operations further comprising:
    determining, by the web-based analytics system, a product ratio for a production site, the product ratio describing a portion of a capacity of the production site used to produce the product and a portion of the capacity of the production site used to produce a second product, wherein the carbon footprint metric for the product is also based on the product ratio for the production site.

3. The web-based analytics system of claim 1, wherein the universal journal table comprises financial accounting data and product costing data.

4. The web-based analytics system of claim 1, the operations further comprising:
    accessing, by the web-based analytics system, a carbon certificate cost from the environmental compliance database system;
    accessing, by the web-based analytics system, a product unit cost for the product from the universal journal table;
    accessing, by the web-based analytics system, a quantity of the product sold; and
    determining, by the web-based analytics system, a financial impact of the product using the carbon footprint metric for the product, the quantity of the product sold, and the product unit cost.

5. The web-based analytics system of claim 4, the operations further comprising:
    accessing, by the web-based analytics system, carbon certificate cost change data from the environmental compliance database system, the carbon certificate cost change data describing a change to the carbon certificate cost;
    determining, by the web-based analytics system, an updated financial impact of the product using the carbon certificate cost change data;
    determining, by the web-based analytics system, that the product is not profitable using the updated financial impact; and
    sending an alert message to a first user via a user interface, the alert message indicating that the product is not profitable.

6. The web-based analytics system of claim 1, wherein the activity comprises working a workpiece on a first machine, wherein the workpiece is included in the product, and wherein the activity carbon footprint data comprises a carbon footprint per unit time for the first machine, the operations further comprising:
    accessing, from the universal journal table, work time data describing a work time for the workpiece; and
    determining a carbon footprint for the activity using the carbon footprint per unit time for the work time and the work time for the workpiece.

7. The web-based analytics system of claim 1, wherein the activity carbon footprint data comprises production carbon metric data for performing the activity using a first machine and second production carbon metric data for performing the activity using a second machine, the web-based analytics system the operations further comprising:
determining that the production carbon metric data for performing the activity using the first machine is less than the production carbon metric data for performing the activity using the second machine; and
instructing the first machine to perform the activity.

8. The web-based analytics system of claim 1, wherein accessing the quantity structure data comprises copying the universal journal table to an in-memory database of the web-based analytics system.

9. A method for using a plurality of data sources to determine a carbon footprint metric for a product, the method comprising:
importing, by a web-based analytics system, indirect carbon footprint data from an environmental compliance database system the environmental compliance database system being distinct from the web-based analytics system;
importing, by the web-based analytics system, quantity structure data describing the product from a universal journal table of an accounting database system the accounting database system being an in-memory database management system distinct from the web-based analytics system, a set of columns of the universal journal table describing the quantity structure data being stored at a random-access memory (RAM) of the accounting database system;
identifying, by the web-based analytics system and using the quantity structure data, a first constituent component for the product;
importing, by the web-based analytics system, first constituent component carbon footprint data for the first constituent component;
identifying, by the web-based analytics system and using the quantity structure data, an activity for the product;
importing, by the web-based analytics system, activity carbon footprint data describing a carbon footprint for the activity, the activity comprising performing at least one operation on a physical workpiece and the activity carbon footprint data describing a machine-hour carbon footprint of the at least one operation at a first machine and a duration of the at least one operation at the first machine;
determining, by the web-based analytics system, the carbon footprint metric for the product using the first constituent component carbon footprint data, the activity carbon footprint data, and the indirect carbon footprint data;
determining, by the web-based analytics system, an alternate carbon footprint metric for the product using the first constituent component carbon footprint data, the indirect carbon footprint data, and second activity carbon footprint data describing performance of the carbon footprint for the activity with a second machine; and
based on the alternate carbon footprint metric being less than the carbon footprint metric, sending an instruction by the web-based analytics system to at least one machine, the instruction causing the at least one machine to direct constituent components of the product to the second machine for performance of the activity.

10. The method of claim 9, further comprising:
determining, by the web-based analytics system, a product ratio for a production site, the product ratio describing a portion of a capacity of the production site used to produce the product and a portion of the capacity of the production site used to produce a second product, wherein the carbon footprint metric for the product is also based on the product ratio for the production site.

11. The method of claim 9, wherein the universal journal table comprises financial accounting data and product costing data.

12. The method of claim 9, further comprising:
accessing, by the web-based analytics system, a carbon certificate cost from the environmental compliance database system;
accessing, by the web-based analytics system, a product unit cost for the product from the universal journal table;
accessing, by the web-based analytics system, a quantity of the product sold; and
determining, by the web-based analytics system, a financial impact of the product using the carbon footprint metric for the product, the quantity of the product sold, and the product unit cost.

13. The method of claim 12, further comprising:
accessing, by the web-based analytics system, carbon certificate cost change data from the environmental compliance database system, the carbon certificate cost change data describing a change to the carbon certificate cost;
determining, by the web-based analytics system, an updated financial impact of the product using the carbon certificate cost change data;
determining, by the web-based analytics system, that the product is not profitable using the updated financial impact; and
sending an alert message to a first user via a user interface, the alert message indicating that the product is not profitable.

14. The method of claim 9, wherein the activity comprises working a workpiece on a first machine, wherein the workpiece is included in the product, and wherein the activity carbon footprint data comprises a carbon footprint per unit time for the first machine, further comprising:
accessing, from the universal journal table, work time data describing a work time for the workpiece; and
determining a carbon footprint for the activity using the carbon footprint per unit time for the work time and the work time for the workpiece.

15. The method of claim 9, wherein the activity carbon footprint data comprises production carbon metric data for performing the activity using a first machine and second production carbon metric data for performing the activity using a second machine, the method further comprising:
determining that the production carbon metric data for performing the activity using the first machine is less than the production carbon metric data for performing the activity using the second machine; and
instructing the first machine to perform the activity.

16. The method of claim 9, wherein accessing the quantity structure data comprises copying the universal journal table to an in-memory database of the web-based analytics system.

17. A non-transitory machine-readable medium comprising instructions thereon that, when executed by at least one processor, causes the at least one processor to execute operations comprising:

importing, by a web-based analytics system, indirect carbon footprint data from an environmental compliance database system the environmental compliance database system being distinct from the web-based analytics system;

importing, by the web-based analytics system, quantity structure data describing a product from a universal journal table of an accounting database system the accounting database system being an in-memory database management system distinct from the web-based analytics system, a set of columns of the universal journal table describing the quantity structure data being stored at a random-access memory (RAM) of the accounting database system;

identifying, by the web-based analytics system and using the quantity structure data, a first constituent component for the product;

importing, by the web-based analytics system, first constituent component carbon footprint data for the first constituent component;

identifying, by the web-based analytics system and using the quantity structure data, an activity for the product;

importing, by the web-based analytics system, activity carbon footprint data describing a carbon footprint for the activity, the activity comprising performing at least one operation on a physical workpiece and the activity carbon footprint data describing a machine-hour carbon footprint of the at least one operation at a first machine and a duration of the at least one operation at the first machine;

determining, by the web-based analytics system, a carbon footprint metric for the product using the first constituent component carbon footprint data, the activity carbon footprint data, and the indirect carbon footprint data;

determining, by the web-based analytics system, an alternate carbon footprint metric for the product using the first constituent component carbon footprint data, the indirect carbon footprint data, and second activity carbon footprint data describing performance of the carbon footprint for the activity with a second machine; and based on the alternate carbon footprint metric being less than the carbon footprint metric, sending an instruction by the web-based analytics system to at least one machine, the instruction causing the at least one machine to direct constituent components of the product to the second machine for performance of the activity.

18. The medium of claim 17, the operations further comprising:
    determining, by the web-based analytics system, a product ratio for a production site, the product ratio describing a portion of a capacity of the production site used to produce the product and a portion of the capacity of the production site used to produce a second product, wherein the carbon footprint metric for the product is also based on the product ratio for the production site.

19. The medium of claim 17, wherein the universal journal table comprises financial accounting data and product costing data.

20. The medium of claim 17, the operations further comprising:
    accessing, by the web-based analytics system, a carbon certificate cost from the environmental compliance database system;
    accessing, by the web-based analytics system, a product unit cost for the product from the universal journal table;
    accessing, by the web-based analytics system, a quantity of the product sold; and
    determining, by the web-based analytics system, a financial impact of the product using the carbon footprint metric for the product, the quantity of the product sold, and the product unit cost.

\* \* \* \* \*